United States Patent [19]

Nee et al.

[11] Patent Number: 5,063,759
[45] Date of Patent: Nov. 12, 1991

[54] SECURITY DEVICE FOR A TRAILER HITCH OR SIMILAR ARTICLE

[75] Inventors: Victor W. Nee; Jonathan J. Cook; Michael N. Bruno, all of South Bend, Ind.

[73] Assignee: International Trade & Technologies, Inc., South Bend, Ind.

[21] Appl. No.: 566,120

[22] Filed: Aug. 10, 1990

[51] Int. Cl.⁵ .............................................. E05B 73/00
[52] U.S. Cl. ......................................... 70/14; 70/50; 70/250
[58] Field of Search .................... 70/14, 57, 58, 258; 280/507

[56] References Cited

U.S. PATENT DOCUMENTS

| | | |
|---|---|---|
| 2,571,349 | 10/1951 | Eckles . |
| 3,226,133 | 12/1965 | Geresy . |
| 3,237,929 | 3/1966 | Geresy ................................ 70/258 |
| 3,410,500 | 11/1968 | Logenecker ......................... 70/58 |
| 3,434,741 | 3/1969 | Grant, Jr. . |
| 3,526,110 | 9/1970 | Foote ................................... 70/58 |
| 3,700,546 | 12/1973 | Logenecker ......................... 70/58 |
| 3,770,298 | 11/1973 | Phillips . |
| 3,810,664 | 5/1974 | Nunnink, Jr. . |
| 3,884,055 | 5/1975 | Vuillemot . |
| 3,977,221 | 8/1976 | Foote . |
| 4,141,569 | 2/1979 | Dilk . |
| 4,291,557 | 9/1981 | Bulle ................................... 70/58 |
| 4,538,827 | 9/1985 | Plifka . |
| 4,571,964 | 2/1986 | Bratzler . |
| 4,577,884 | 3/1986 | Harris . |
| 4,581,908 | 4/1986 | Bulle et al. . |
| 4,730,841 | 3/1988 | Ponder . |
| 4,756,172 | 7/1988 | Weaver ................................ 70/58 |
| 4,774,823 | 10/1988 | Callison . |

FOREIGN PATENT DOCUMENTS

2611622 2/1987 France .

Primary Examiner—Robert L. Wolfe
Attorney, Agent, or Firm—Barnes & Thornburg

[57] ABSTRACT

A security device for a trailer hitch or similar article which engages with an outwardly extending peripherial flange around the trailer hitch or similar article, and which includes an element which extends into a coupling opening in the trailer hitch or similar article, thus precluding removal of the security device from the trailer hitch or similar article. A padlock is utilized to deter unauthorized removal of the security device from the trailer hitch or similar article, and the security device includes means to protect the shackle of the padlock from unauthorized removal.

29 Claims, 4 Drawing Sheets

SECURITY DEVICE FOR A TRAILER HITCH OR SIMILAR ARTICLE

BACKGROUND AND SUMMARY OF THE INVENTION

The present invention relates generally to a new and novel security device for a trailer hitch or similar article. More particularly, the present invention relates to a security device which enters into a coupling opening in a trailer hitch or similar article, thus precluding unauthorized hitching or movement of the trailer.

The concept of utilizing a security device to preclude access to the coupling opening of a trailer hitch when the trailer is left unattended is well known. U.S. Pat. No. 3,410,580 to Longenecker, U.S. Pat. No. 3,526,110 to Foote, U.S. Pat. No. 3,780,546 to Longenecker, U.S. Pat. No. 3,810,664 to Nunnink, Jr., et al., U.S. Pat. No. 3,977,221 to Foote, U.S. Pat. No. 4,291,557 to Bulle, et al. and U.S. Pat. No. 4,581,908 to Bulle, et al. are directed to security devices for a trailer hitch which utilize a lock integral to the security device. Such integral locking arrangements typically add to the complexity and cost of the security device, and the substitution of alternate locks is not readily accomplished. Also, such integral locking arrangements are often adversely affected by exposure to the environment, and thus can be rendered ineffective by moisture, freezing and thawing temperature cycles and corrosion. Further, some of these devices require an additional separate tool to secure the security device to the trailer hitch.

U.S. Pat. No. 2,571,349 to Eckles, U.S. Pat. No. 3,237,969 to Gersey, U.S. Pat. No. 3,434,741 to Grant, Jr. and U.S. Pat. No. 3,884,055 to Vuillemot are directed to trailer hitch security devices which are retained by a Padlock. Such an arrangement permits the lock to be readily changed, and typically reduces the cost and complexity of the security device. However, in these devices, the shackle of the padlock remains exposed when positioned in the security device. Thus, the padlock shackle is exposed to unauthorized removal by tools such as bolt cutters, hack saws or pry bars. Once the padlock is so removed, these security devices are rendered inoperative.

U.S. Pat. No. 4,141,569 to Dilk and U.S. Pat. No. 4,730,841 to Ponder both disclose trailer hitch security devices which utilize padlocks. Also, these devices include an enclosure for surrounding, and thus protecting the shackle of the padlock. However, in use, these security devices are large, heavy and cumbersome. Further, these devices would be relatively expensive to produce because of the mass of material necessary to fabricate these devices, as well as the relatively large number of parts involved.

Accordingly, an object of the present invention is the provision of a security device for a trailer hitch or similar article which is relatively light in weight, and compact in size, but yet provides protection from unauthorized removal.

Another object of the present invention is to provide a security device for a trailer hitch or similar article which includes a minimum number of separate components.

A further object of the present invention is to provide a security device for a trailer hitch or similar article which does not require a separate tool to engage the security device to the trailer hitch or similar device.

Still another object of the present invention is to provide a security device for a trailer hitch or similar article which utilizes a padlock and includes shackle protection to deter unauthorized removal of the padlock.

A still further object of the present invention is to provide a security device for a trailer hitch or similar article which does not extend around the front surface of the trailer hitch or similar article, thus detering unauthorized individuals from removing the security device by prying on this area.

These and other objects of the present invention are attained by the provision of a security device for a trailer hitch or similar article which engages with an outwardly extending peripheral flange around the trailer hitch or similar article, and includes an element which extends into a coupling opening in the trailer hitch or similar article, thus precluding removal of the security device from the trailer hitch or similar article. A padlock is utilized to deter unauthorized removal of the security device from the trailer hitch or similar article, and the security device includes means to shield the shackle of the padlock from unauthorized disengagement.

Other objects, advantages and novel features of the present invention will become apparent from the following detailed description of the invention when considered in conjunction with the accompanying drawings.

DETAILED DESCRIPTION OF THE DRAWINGS

Referring now to the drawings, in which like referenced characters indicate corresponding elements throughout the several views, attention is first directed to FIGS. 1 through 4 which illustrate a preferred embodiment of a security device for a trailer hitch or similar article, designated generally by the number 30, engaged on trailer hitch 20. Trailer hitch 20 is of conventional design, and includes at its rearward end openings 22 which permit attachment of trailer hitch 20 to a trailer (not shown) utilizing conventional fasteners (not shown). It will be recognized that trailer hitch 20 can be attached to the trailer (not shown) in other ways, for example, by welding, riveting, or utilizing some other joining process.

Figure 2:
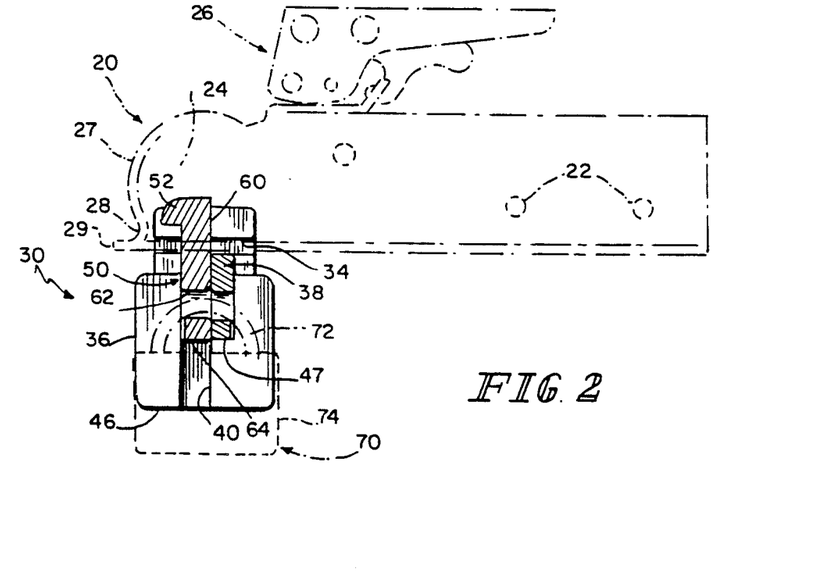
FIG. 2 is a longitudinal cross-sectional view of the security device for a trailer hitch or similar article shown in FIG. 1 taken across line 2—2 of FIG. 1 with the trailer hitch shown in phantom lines.
Figure 3:
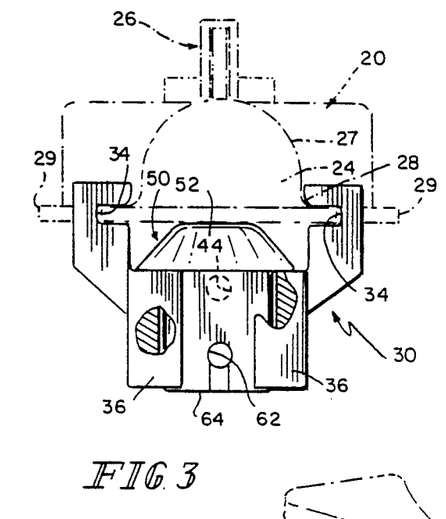
FIG. 3 is a front view of the security device for a trailer hitch or similar article shown in FIG. 1 with the padlock removed and the security device in its inoperative position with the trailer hitch shown in phantom lines.

As seen in FIG. 2, the forward end of trailer hitch 20 includes coupling opening 24, which is dimensioned to engage with a towing ball (not shown) mounted on the draft vehicle (not shown). The diameter of coupling opening 24 varies, depending upon factors such as the weight of the trailer (not shown) being towed, but coupling opening is conventionally either 1 ⅞ inches in diameter, or 2 inches in diameter. A conventional latching arrangement, shown generally as 26, is mounted adjacent coupling opening 24, and secures the towing ball (not shown) within coupling opening 24 when the trailer (not shown) is being towed.

Exterior surface 27 of coupling opening 24 transitions through radius portion 28 to horizontally extending peripheral flange 29. While the dimension of radius portion 28 and horizontally extending peripheral flange 29 vary with the different trailer hitch manufacturers, these features are generally included in trailer hitch 20.

Figures 1, 1A:
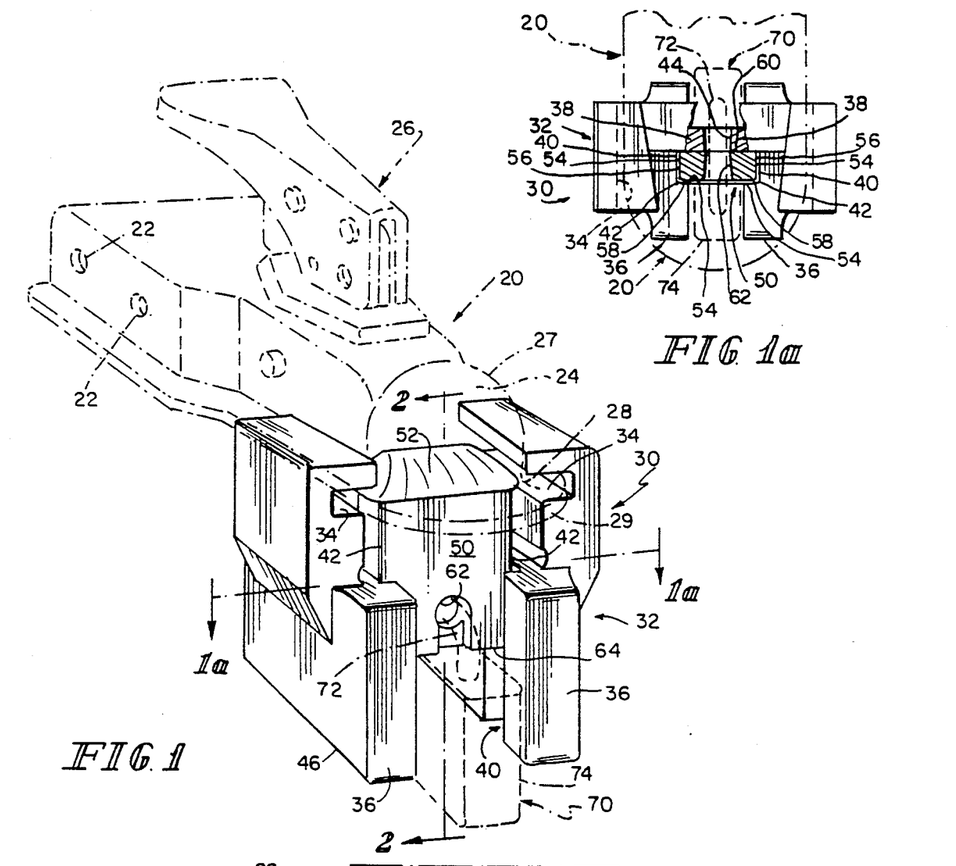
FIG. 1, which illustrates a preferred embodiment of a security device for a trailer hitch or similar article, shows a perspective view of the security device attached to a trailer hitch with the trailer hitch shown in phantom lines.
FIG. 1a is a supplemental cross-sectional view of the security device for a trailer hitch or similar article shown in FIG. 1 taken across line 1a—1a of FIG. 1 with the trailer hitch shown in phantom lines.

Security device 30 consists generally of body 32, projection element 50, and padlock 70. Although many materials may be used, applicant has found it advantageous to fabricate body 32 and projection element 50 from a cast ductile iron material. Body 32 includes a plurality of horizontally extending channels 34 which are dimensioned to slide in relation to horizontally extending peripheral flange 29. The height and depth of horizontally extending channels 34 are dimensioned to accommodate variations in radius portion 28 and horizontally extending peripheral flange 29. Legs 36 extend downwardly below horizontally extending channel 34, and are joined by web 38.

Projection element 50 is generally rectangular in configuration and includes enlarged head portion 52 which, when security device 30 is in its operative position, extends into coupling opening 24 of trailer hitch 20. Side surfaces 54 of projection element 50 include straight portion 56 which transitions into radius portion 58 along a line approximately two-thirds of the distance through the depth of projection element 50 from back surface 60. Side surfaces 54 are dimensioned to slide in relation to vertically extending channels 40 of body 32. Vertically extending channels 40 extend into legs 36 at the transition from legs 36 to web 38. Vertically extending channels 40 include straight portion 41 which transitions into radius portion 42 along a line approximately two-thirds of the distance through the width of vertically extending channels 40 from web 38 to match the configuration of side surfaces 54. The utilization of straight portions 41 and 56 transitioning into radius portions 42 and 58 assure that projection element 50 is in the proper orientation within body 32. However, it will be recognized by those skilled in the relevant art that other channel and matching side surface configurations could be used, including, for example, square-shaped, U-shaped, or even no channel at all. Enlarged head portion 52 retains projection element in body 32 when padlock 70 is not engaged.

Figure 4:
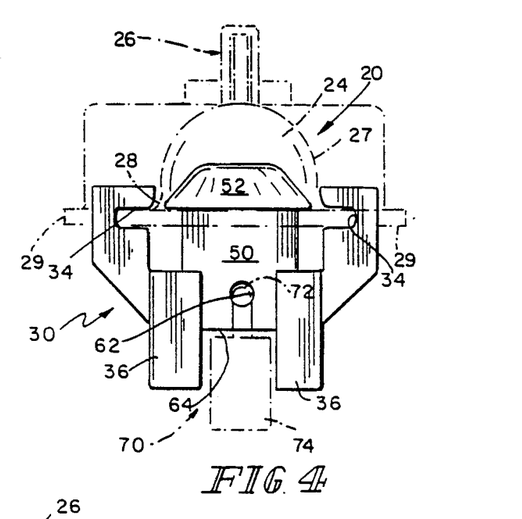
FIG. 4 is a front view of the security device for a trailer hitch or similar article shown in FIG. 1 with the security device in its operative position with the trailer hitch shown in phantom lines.

Web 38 includes centrally located opening 44. Similarly, projection element 50 includes centrally located opening 62. Opening 44 and opening 62 are vertically orientated such that when enlarged head portion 52 has entered into coupling opening 24, opening 44 and opening 62 are aligned. In this operative position shackle 72 of padlock 70 is placed through openings 44 and 62 to secure projection element 50 in this position. Preferably, the exterior portions of openings 44 and 62 are tapered to accommodate the curvature of shackle 72 while maintaining the diameter of the through hole.

Web 38 includes cavity 45 of a generally rectangular configuration in its bottom surface 46. The width of cavity 45 is dimensioned to secure lock body 74 of padlock 70 when shackle 72 is engaged through openings 44 and 62. Similarly, projection element 50 includes bottom surface 64 which is dimensioned to be flush with bottom surface 47 of web 38 when shackle 72 is engaged in openings 44 and 62. Legs 36 preferably extend both forwardly and rearwardly of web 38 to a sufficient distance such that the exposed portion of shackle 72 is shielded when shackle 72 is engaged within lock body 74 of padlock 70. This shielding of shackle 72 provides protection against the entry of bolt cutters, hack saws, pry bars or other tools which may be used by unauthorized individuals to disengage padlock 70.

In operation, security device 30 is installed with padlock 70 removed, and enlarged head portion 52 of projection element 50 resting on web 38. Security device 30 is aligned with the front of trailer hitch 20 so horizontally extending channels 34 are aligned with horizontally extending peripheral flange 29. When so aligned, security device 30 is pushed horizontally permitting horizontally extending channels 34 to engage with horizontally extending peripheral flange 29. This movement is continued until enlarged head portion 52 of projection element 50 is orientated under coupling opening 24. At this position, projection element 50 is pushed upwardly to cause enlarged head portion 52 to enter coupling opening 24 and aligning openings 44 and 62. Shackle 72 of padlock 70 is then inserted through openings 44 and 62 to secure projection element 50, and thus security device 30, in its operative position.

To disengage security device 30 from trailer hitch 20, shackle 72 is disengaged from lock body 74 of padlock 70 using, for example, a key (not shown). Shackle 72 is then removed from openings 44 and 62 thus allowing projection element 50 to drop downwardly out of coupling opening 24. Security device 30 is then pulled horizontally off trailer hitch 20. In order to store security device 30 as a single integral unit, openings 44 and 62 can be aligned after security device 30 has been removed from trailer hitch 20. Shackle 72 is then placed through openings 44 and 62 and engaged with lock body 74 of padlock 70 to provide a integral compact volume for storage of security device 30 when not in use.

Referring now to FIGS. 5 through 8, a second embodiment of a security device for a trailer hitch is shown generally as 130. This embodiment preferably includes body 132 and padlock 70. Body 132 is preferably a single integral piece. Body 132 includes a plurality of horizontally extending channels 134 dimensioned to slide in relation to horizontally extending peripheral flange 29. In the embodiment shown in the drawings, horizontally extending channels 134 transition from parallel portion 135 into radius portion 137. Parallel portion 135 and radius portion 137 correspond to the transitional radius of horizontally extending peripheral flange 29. When radius portion 137 makes contact with horizontally extending peripheral flange 29, a stop is provided, thus providing proper orientation between security device 130 and trailer hitch 20. While horizontally extending channels 134 could be extended to completely enclose horizontally extending peripheral flange 29, and thus provide a more secure stop, this is undesirable from the applicant's point of view since such a design provides an accessible and convenient pry point for unauthorized individuals to place a pry bar to attempt to pry security device 130 from trailer hitch 20 in a forward direction.

Bottom surface 133 of horizontally extending channels 134 extends the entire width of body 132. Bottom surface 133 includes two symmetrical openings 139 which extend to outer wall 141 and are centrally positioned in body 132. Openings 139 preferably include parallel side walls 143 which extend from outer wall inward and transition together through radius portion 145. Centrally located longitudinally extending web 138 separates the two openings 139. Longitudinally extending web 138 transitions at its forward and rearward extremes into downwardly extending legs 136. Downwardly extending legs 136 are dimensioned to be of sufficient width to shield the exposed shackle 72 of padlock 70 when shackle 72 is engaged with lock body 74 of padlock 70 in security device 130.

Figures 5, 6:
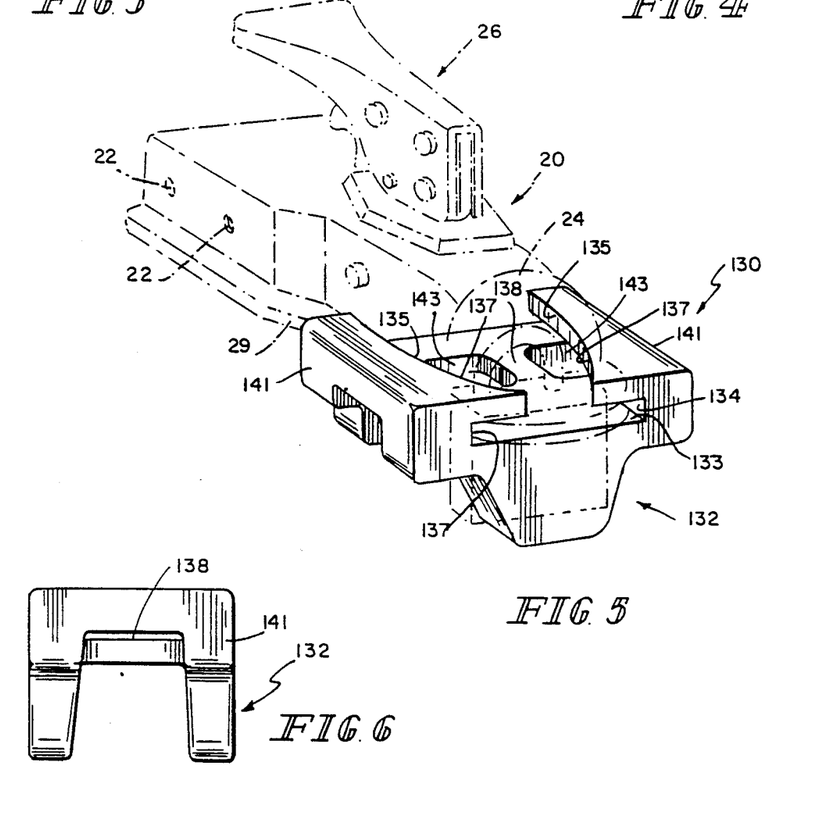
FIG. 5, which illustrates a second Preferred embodiment of a security device for a trailer hitch or similar article shows a perspective view of the security device attached to a trailer hitch with the trailer hitch shown in phantom lines.
FIG. 6 is a side view of the second embodiment of the security device for a trailer hitch or similar article shown in FIG. 5.
Figure 7:
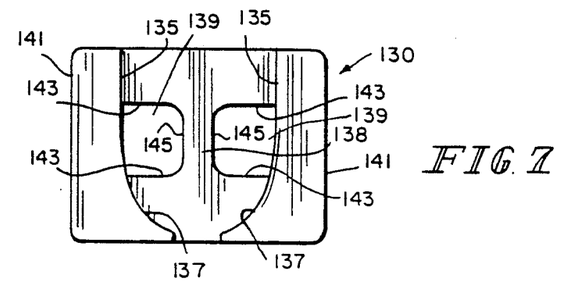
FIG. 7 is a top view of the second embodiment of the security device for a trailer hitch or similar article shown in FIG. 5.
Figure 8:
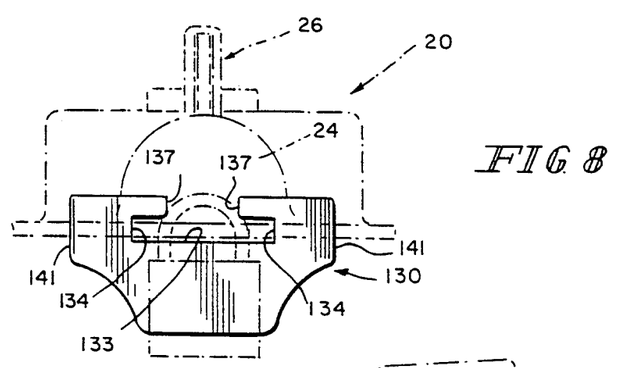
FIG. 8 is a front view of the second embodiment of the security device for a trailer hitch or similar article shown in FIG. 5 with the trailer hitch shown in phantom lines.

In operation, security device 130 is installed with padlock 70 removed. Security device 130 is aligned to the front of trailer hitch 20 so that horizontally extending channels 134 are aligned with horizontally extending peripheral flange 29. When so aligned, security device 130 is moved horizontally rearward, thus engaging horizontally extending channels 134 with horizontally extending peripheral flange 29. This movement continues until radius portion 137 contacts horizontally extending peripheral flange 29, thus positioning security device 130 in the proper orientation with respect to coupling opening 26 of trailer hitch 20. Shackle 72 of padlock 70 is then placed up through openings 139, thus securing shackle 72 over web 138. Once so positioned, shackle 72 is engaged with lock body 74 of padlock 70 and security device 130 is secured on trailer hitch 20.

To disengage security device 130 from trailer hitch 20, shackle 72 is disengaged from lock body 74 of padlock 70 using, for example, a key (not shown). Shackle 72 is then removed from openings 139, and padlock 70 removed from security device 130. Security device 130 is moved horizontally forward to clear trailer hitch 20. For storage, shackle 72 of padlock 70 can be reinserted through openings 139, and engaged with lock body 74 of padlock 70 to form a single integral unit for compact storage when security device 130 is not in use.

Referring now to FIGS. 9 through 12, a third embodiment of a security device for a trailer hitch is shown generally as 230. This embodiment preferably includes a plurality of horizontally extending channels 234 similar to that previously described in connection with security device 130. Therefore, reference is made to this previous discussion, and such disclosure is incorporated into this embodiment by reference.

Bottom surface 233 of horizontally extending channels 34 extends the entire width of security device 230. Bottom surface 233 includes two generally rectangular cut-out portions 39, both of which are open to rear wall 235 of bottom surface 33. Centrally positioned, rearwardly extending web 238 separates cut-out portions 239. Rearwardly extending web 238 transitions at its rearward extreme to downwardly extending leg 236. Downwardly extending leg 236 is preferably the same width as web 238 and extends downwardly a sufficient distance to shield the exposed portion of shackle 72 when padlock 70 is engaged with lock body 74 of padlock 70 in security device 30. The height of downwardly extending leg 236 is dimensioned such that padlock 70 can be slid over downwardly extending leg 36 when shackle 72 is disengaged from lock body 74 The width of rearwardly extending web 238 is such that it accommodates shackle 72 when engaged in lock body 74. The width of rearwardly extending web 238 is such that it will accommodate the width of lock body 74 when shackle 72 is engaged with lock body 74. If desired, side wall 241 can be extended downward to further shield shackle 72 when engaged with lock body 74 on security device 230.

Figure 9:
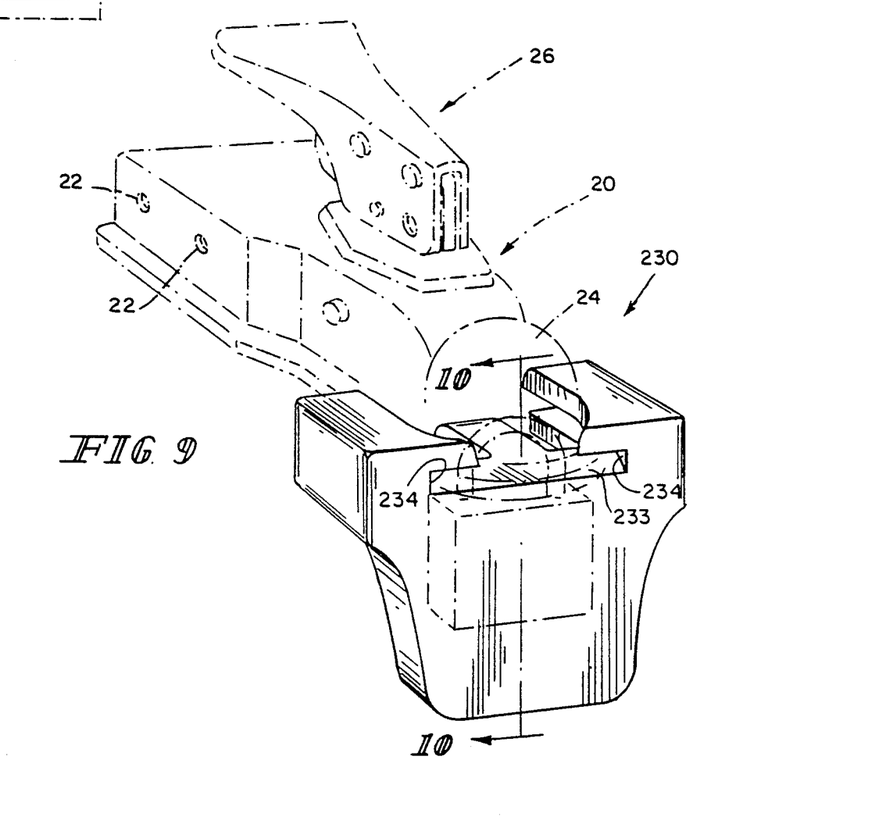
FIG. 9, which illustrates a third preferred embodiment of a security device for a trailer hitch or similar article, shows a perspective view of the security device attached to a trailer hitch with the trailer hitch shown in phantom lines.
Figure 10:
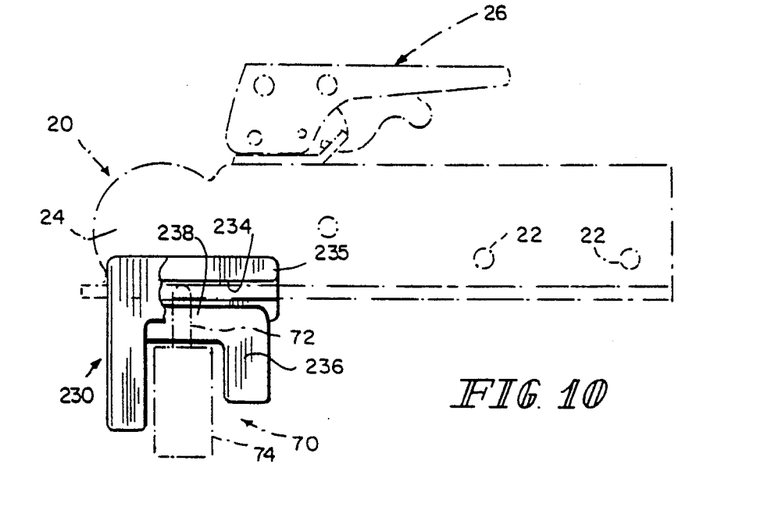
FIG. 10 is a longitudinal cross-sectional view of the third embodiment of the security device for a trailer hitch or similar article shown in FIG. 9 taken across line 10—10 of FIG. 9 with the trailer hitch shown in phantom lines.
Figure 11:
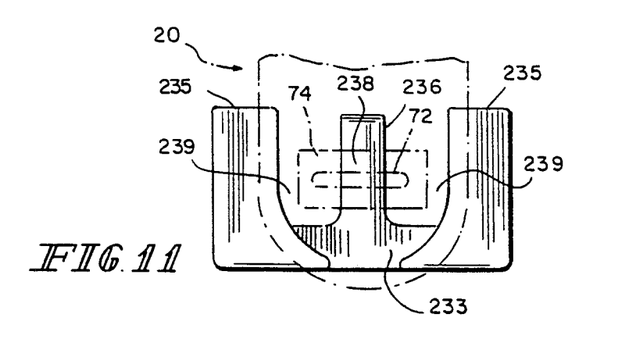
FIG. 11 is a top view of the third embodiment of the security device for a trailer hitch or similar article shown in FIG. 9 with the trailer hitch shown in phantom lines.
Figure 12:
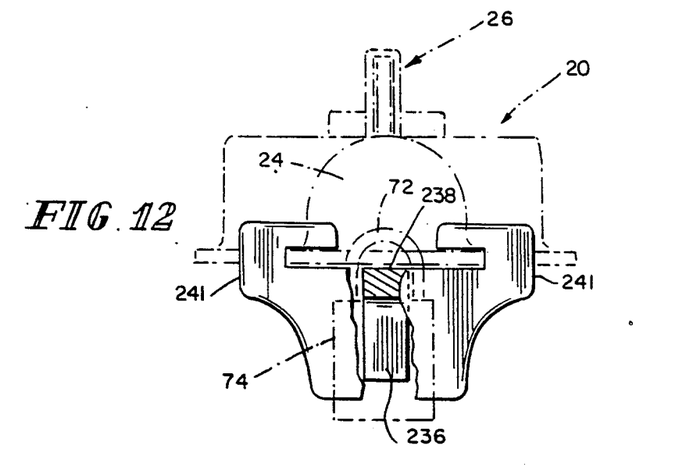
FIG. 12 is a front view of the third embodiment of the security device for a trailer hitch or similar article shown in FIG. 9 with the trailer hitch shown in phantom lines.

In operation, security device 230 is initially installed on trailer hitch 20 in the same manner as previously described for security device 130. However, once security device 230 is orientated in the proper position on trailer hitch 20, shackle 72 of padlock 70 is moved forward over downwardly extending leg 236 across web 238. This eliminates the necessity of routing shackle 72 upward through one opening, and downward through a second opening. Once shackle 72 is brought into position over web 238, it can be engaged with lock body 74 of padlock 70, thus retaining security device 230 on trailer hitch 20.

To disengage security device 230 from trailer hitch 20, shackle 72 is disengaged from lock body 74 of padlock 70 using, for example, a key (not shown). Padlock 70 is then slid rearward over downwardly projecting leg 236 and removed. Security device 230 is then moved horizontally forward to clear trailer hitch 20. For storage, shackle 72 of padlock 70 can be reattached over web 238, and engaged with lock body 74 to form an integral unit for compact storage when security device 230 is not in use.

From the preceding description of the preferred embodiments, it is evident that the objects of the invention are attained by the present invention. Although this invention has been described and illustrated in detail, it is to be clearly understood that the same is by way of illustration and example only and is not to be taken by way of limitation. For example, the first preferred embodiment discussed could be readily modified to incorporate a stop to orient the security device on the trailer hitch as discussed in connection with the second preferred embodiment. Therefore, the spirit and scope of this invention are to be limited only by the terms of the appended claims.

What is claimed is:

1. A security device for a trailer hitch, said trailer hitch having a peripheral flange and a coupling opening, comprising:
   a body member which engages with said peripheral flange of said trailer hitch to restrict vertical movement of said security device in relation to said trailer hitch;
   said body member having two downwardly projecting substantially parallel legs;
   a projection element which slides vertically between said legs for entering into said coupling opening in said trailer hitch to restrict horizontal movement of said security device in relation to said trailer hitch;
   a first means connected to, but independent of, said body member for removably retaining said security device in position on said trailer hitch;
   said first means includes a shackle and a lock body and said shackle is removably retained within said lock body;
   said body member includes a second means for precluding access to said shackle when said shackle is secured to said lock body in said security device.

2. The security device for a trailer hitch of claim 1 wherein said body member includes at least one horizontally extending channel which slideably engages with said peripheral flange of said trailer hitch to restrict vertical movement of said security device in relation to said trailer hitch.

3. The security device for a trailer hitch of claim 2 wherein said body member includes two horizontally extending channels, said horizontally extending channels are substantially parallel along their entire length.

4. The security device for a trailer hitch of claim 1 wherein said body member includes two horizontally extending channels, said horizontally extending channels are parallel over a portion of their length and radially extend towards each other over a portion of their length.

5. The security device for a trailer hitch of claim 1 wherein said projection element slides from a position below said coupling opening in said trailer hitch to a position extending from said body member into said coupling opening in said trailer hitch.

6. The security device for a trailer hitch of claim 5 wherein said legs extend below said shackle when said shackle is retained within said lock body to preclude access to said shackle.

7. The security device for a trailer hitch of claim 6 wherein:
   said body member includes a transverse web which extends between said legs;
   said transverse web includes a first opening;
   said projection element includes a second opening such that when said projection element extends upwardly into said coupling cavity, said first opening and said second opening are aligned; and
   said shackle extends through said first opening and through said second opening to retain said projection element in position relative to said body member.

8. The security device for a trailer hitch of claim 7 wherein said body member includes at least one vertically extending channel such that said projection element is retained in said vertically extending channel to restrict horizontal movement of said projection element relative to said body member.

9. The security device for a trailer hitch of claim 8 wherein:
   said projection element has a first and a second vertical side edge;
   said vertical side edge of said projection element includes a straight portion and a radius portion;
   said vertically extending channel includes a straight portion and a radius portion; and
   said straight portion and said radius portion of said vertical side edge of said projection element corresponds to said straight portion and said radius portion of said vertically extending channels to ensure proper orientation of said projection element in relation to said body member.

10. The security device for a trailer hitch of claim 9 wherein said projection element includes an enlarged head portion to preclude continued vertical downward movement of said projection element in relation to said body member at a predetermined location.

11. The security device for a trailer hitch of claim 1 wherein said second means comprises a padlock.

12. The security device for a trailer hitch of claim 11 wherein said shackle of said padlock extends upwardly from said body member entering into said coupling opening in said trailer hitch to restrict horizontal movement of said security device in relation to said trailer hitch.

13. The security device for a trailer hitch of claim 11 wherein said body member includes downwardly extending legs which extend below said shackle of said padlock to preclude access to said shackle when engaged to said security device.

14. The security device for a trailer hitch of claim 1 wherein said body member is fabricated as a cast iron casting.

15. A process for securing a security device to a trailer hitch, said trailer hitch including a coupling opening and an outwardly extending flange extending from said coupling opening, comprising the steps of:
   aligning a horizontally extending channel in a body member with said outwardly extending flange;
   moving said body member horizontally to engage said horizontally extending channel with said outwardly extending flange to a position where a projection element is orientated directly below said coupling opening;
   moving said projection element vertically upward such that a portion of said projection element enters into said coupling opening, and an opening in said body member is aligned with an opening in said projection element;
   inserting a shackle of a padlock through said opening in said body member and said opening in said projection element; and
   securing said shackle of said padlock into a lock body of said padlock.

16. A process for securing a security device to a trailer hitch, said trailer hitch including a coupling opening and an outwardly extending flange extending from said coupling opening, comprising the steps of:
- aligning a horizontally extending channel in a body member with said outwardly extending flange;
- moving said body member horizontally to engage said horizontally extending channel with said outwardly extending flange;
- continuing movement of said body member relative to outwardly extending flange until a radius portion of said horizontally extending channel contacts said outwardly extending flange;
- inserting a shackle of a padlock through said body member so a portion of said shackle enters into said coupling opening; and
- securing said shackle of said padlock into a lock body of said padlock.

17. A security device for a trailer hitch, said trailer hitch having a coupling opening and an outwardly extending flange extending from said coupling opening, comprising:
- a body member having a first and a second downwardly extending leg;
- said body member includes a transverse web member extending between said first and said second downwardly extending leg;
- said web member includes a first opening;
- a projection element slideably positioned between said first and said second downwardly extending leg;
- said projection element includes a second opening which is aligned with said first opening in said web member when a predetermined portion of said projection element enters into said coupling opening;
- a padlock having a shackle and a lock body for removably securing said first opening in said web member in alignment with said second opening in said projection element.

18. The security device for a trailer hitch of claim 17 wherein said body member includes at least one horizontally extending channel which slideably engages with said peripheral flange of said trailer hitch to restrict vertical movement of said security device in relation to said trailer hitch.

19. The security device for a trailer hitch of claim 18 wherein said body member includes downwardly extending legs which extend below said shackle of said padlock to preclude access to said shackle when engaged to said security device.

20. The security device for a trailer hitch of claim 19 wherein said body member includes two horizontally extending channels, said horizontally extending channels are parallel over a portion of their length and radially extend toward each other over a portion of their length.

21. The security device for a trailer hitch of claim 19 wherein said body member includes two horizontally extending channels, said horizontally extending channels are substantially parallel along their entire length.

22. The security device for a trailer hitch of claim 21 wherein said body member includes at least one vertically extending channel such that said projection element is retained in said vertically extending channel to restrict horizontal movement of said projection element relative to said body member.

23. The security device for a trailer hitch of claim 22 wherein:
- said projection element has a first and a second vertical side edge;
- said vertical side edge of said projection element includes a straight portion and a radius portion;
- said vertically extending channel includes a straight portion and a radius portion; and
- said straight portion and said radius portion of said vertical side edge of said projection element corresponds to said straight portion and said radius portion of said vertically extending channels to ensure proper orientation of said projection element in relation to said body member.

24. The security device for a trailer hitch of claim 23 wherein said projection element includes an enlarged head portion to preclude continued vertical downward movement of said projection element in relation to said body member at a predetermined location.

25. The security device for a trailer hitch of claim 24 wherein said shackle of said padlock extends upwardly from said body member entering into said coupling opening in said trailer hitch to restrict horizontal movement of said security device in relation to said trailer hitch.

26. A security device for a trailer hitch, said trailer hitch having a peripheral flange and a coupling opening, comprising:
- a body member which engages with said peripheral flange of said trailer hitch to restrict vertical movement of said security device in relation to said trailer hitch;
- a padlock including a shackle and a lock body and said shackle is removably retained within said lock body;
- said body member includes means for precluding access to said shackle when said shackle is secured to said lock body in said security device; and
- said shackle extends upwardly from said body member into said coupling opening in said trailer hitch to restrict horizontal movement of said security device in relation to said trailer hitch.

27. The security device for a trailer hitch of claim 26, wherein said body member includes two horizontally extending channels, said horizontally extending channels are substantially parallel along their entire length.

28. The security device for a trailer hitch of claim 26, wherein said body member includes two horizontally extending channels, said horizontally extending channels are parallel over a portion of their length and radially extend towards each other over a portion of their length.

29. The security device for a trailer hitch of claim 26, wherein said body member includes downwardly extending legs which extend below said shackle of said padlock to preclude access to said shackle when engaged to said security device.

* * * * *

UNITED STATES PATENT AND TRADEMARK OFFICE
CERTIFICATE OF CORRECTION

PATENT NO. : 5,063,759
DATED : November 12, 1991
INVENTOR(S) : Victor W. Nee, et. al.

It is certified that error appears in the above-indentified patent and that said Letters Patent is hereby corrected as shown below:

```
On the Title page, item [56], under References Cited:
Column 1, line 3, delete "3,237,929" and insert --3,237,969-- therefor.
Column 1, line 4, delete "3,410,500" and insert --3,410,580-- therefor.
Column 1, line, delete "Logenecker" and insert --Longenecker-- therefor.
Column 1, line 7, delete "3,700,546" and insert --3,780,546-- therefor.
Column 1, line 7, delete "Logenecker" and insert --Longenecker-- therefor.
Column 1, line 37, delete "Padlock" and insert --padlock-- therefor.
Column 2, line 54, delete "Preferred" and insert --preferred-- therefor.
Column 6, line 22, delete "34" and insert --234-- therefor.
Column 6, line 25, delete "33" and insert --233-- therefor.
Column 6, line 24, delete "39" and insert --239--therefor.
Column 6, line 33, delete "30" and insert --230-- therefor.
Column 6, line 35, delete "36" and insert --236-- therefor.
Column 6, line 36, insert --.-- after "74".
```

Signed and Sealed this

Fifteenth Day of June, 1993

Attest:

MICHAEL K. KIRK

Attesting Officer

Acting Commissioner of Patents and Trademarks